3 Sheets—Sheet 2.

C. H. PALMER.
MACHINE FOR MOLDING KNOBS.

No. 111,470. Patented Jan. 31, 1871.

3 Sheets—Sheet 3.
C. H. PALMER.
MACHINE FOR MOLDING KNOBS.
No. 111,470. Patented Jan. 31, 1871.
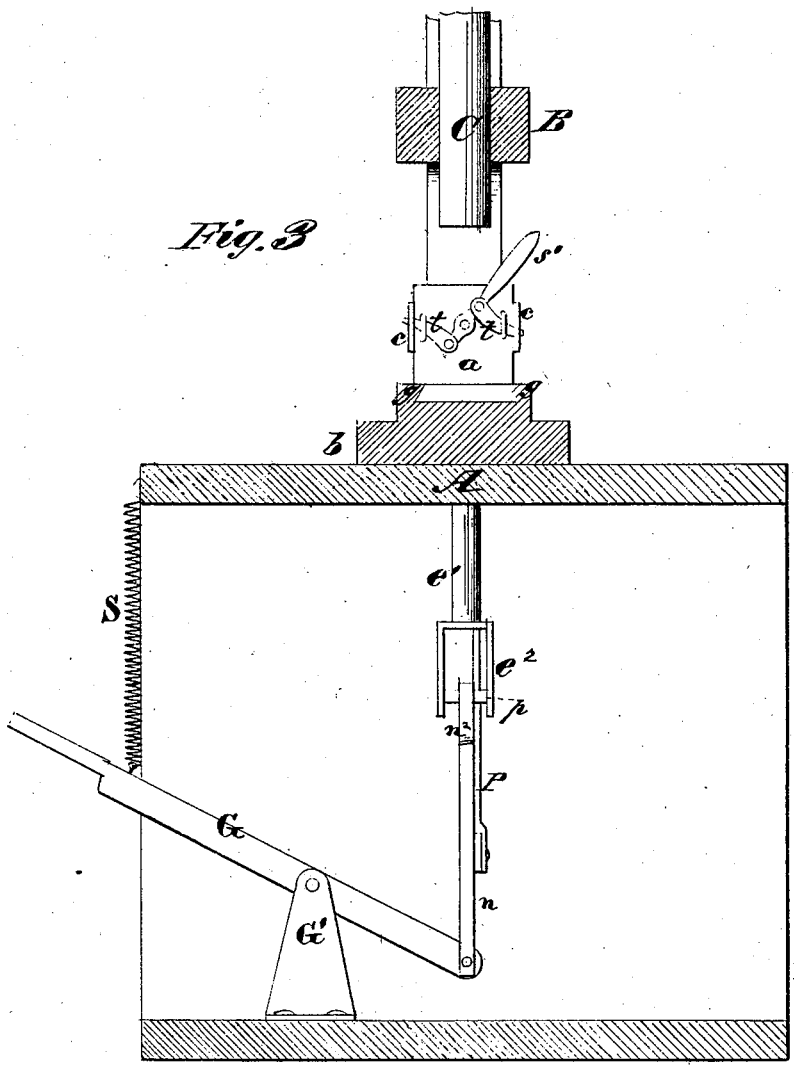
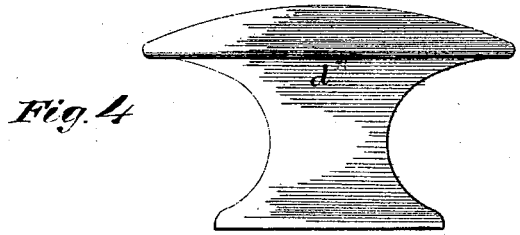
Witnesses.  Inventor

United States Patent Office.

CHARLES H. PALMER, OF BROOKLYN, E. D., NEW YORK.

Letters Patent No. 111,470, dated January 31, 1871.

IMPROVEMENT IN MACHINES FOR MOLDING KNOBS.

*The Schedule referred to in these Letters Patent and making part of the same.*

*To all whom it may concern:*

Be it known that I, CHARLES H. PALMER, of Brooklyn, E. D., in the county of Kings and State of New York, have invented a new and useful Machine for Molding Knobs; and I do hereby declare that the following is a full, clear, and exact description thereof, reference being had to the accompanying drawing making part of this specification, in which—

Figure 1:
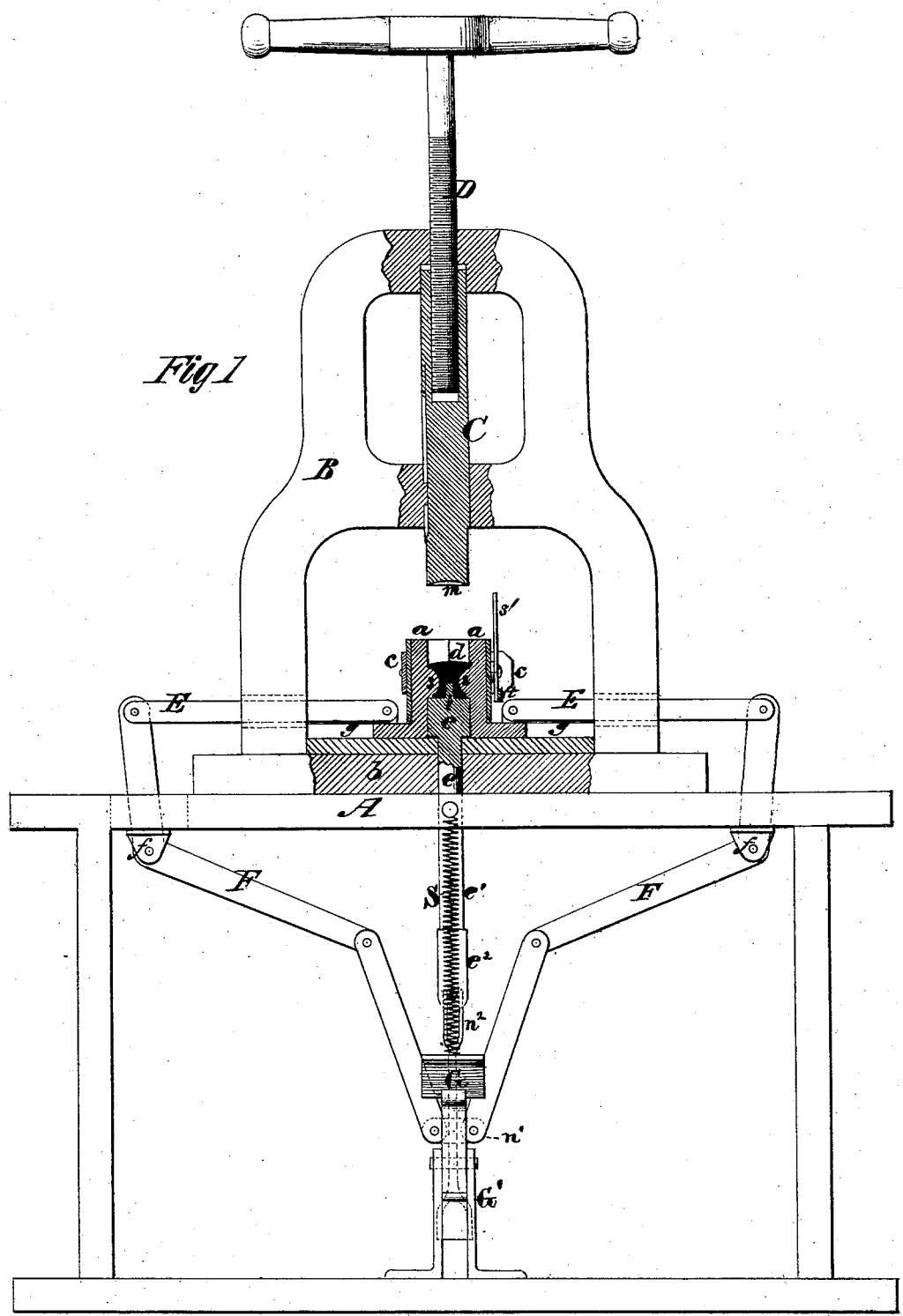

Figure 1, plate 1, is a front elevation of my improved molding-machine, partly in section, showing a knob ready to be removed.

Figure 2:
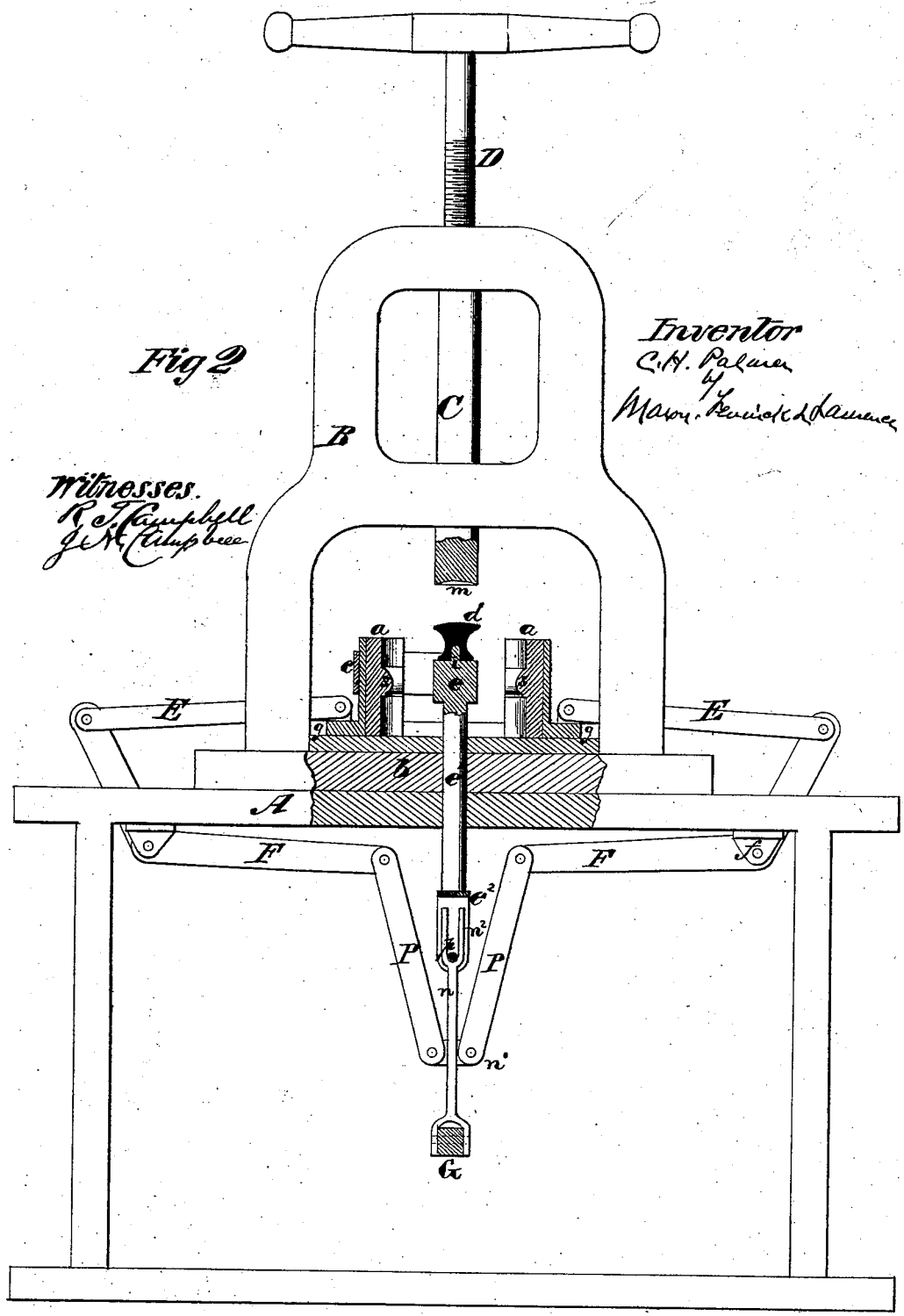

Figure 2, plate 2, is an elevation of the machine, partly in section, showing a knob relieved from its mold-sections and raised to a position for removal.

Figure 3, plate 3, is a section taken transversely and vertically through parts of the machine, on one side of the center thereof, showing particularly the device for locking together the molds.

Figure 4, plate 3, is a view of one form of knob which my machine is adapted for molding.

Similar letters of reference indicate corresponding parts in the several figures.

This invention relates to machinery which is adapted for molding drawer, shutter, and sash-knobs of porcelain, clay, or other suitable molding material. The difficulty to be overcome in the production of these kinds of knobs consists in the formation of the contracted necks which are between the heads and bases. This has been done before my invention by means of two semicircular mold-sections, which were dropped into a mold, and which were removed with the knobs from the mold and then detached by hand from the knobs.

The nature of my invention and improvement consists—

First, in two vertically-divided laterally-movable mold-sections, which are applied between suitable guides, and which have constructed on their inner surfaces those parts of the mold which produce the contracted necks of the knobs, in combination with a pressing-plunger for condensing the clay in the mold, as will be hereinafter explained.

Second, in the combination of a device for elevating the finished knobs from the mold, with laterally-movable mold-sections and a pressing-plunger, as will be hereinafter explained.

Third, in the combination of a bracing-strap and a locking-device with the said laterally-movable mold-sections, whereby these sections are prevented from separating during the act of pressing the clay in them, as will be hereinafter explained.

Fourth, in the combination of a treadle, which is held up by a spring, with a system of levers, which are connected to the laterally-movable molds for separating and bringing them together, and also with a device which will lift the knobs after the mold-sections have been separated, as will be hereinafter explained.

To enable others skilled in the art to understand my invention, I will describe its construction and operation.

In the accompanying drawing—

A represents a suitable device or table, upon which is secured an upright press-frame, B, in which works up and down a pressing follower or plunger, C, which is prevented from turning by a feather and groove, and which is moved up and down by a screw, D.

The lower end $m$ of the plunger C is concave, and forms that part of the mold which produces the convex surfaces on the heads of the knobs.

Upon the sill $b$ of the frame B are supported two upright mold-sections $a$ $a$, which constitute the body of the mold, and which are allowed to slide toward and from each other, but are guided and held down in place by a dovetail-groove, $g$, into which the bases of the sections $a$ $a$ are fitted. When these sections $a$ $a$ are brought together and locked, as will be hereinafter explained, they present an annular convex portion, $s$, which produces the annular concavity or contracted necks of the knobs $d$, as shown in fig. 1.

The portions $s$ on the two sections $a$ $a$ may be so applied within these sections that they are readily removable when it is desired to substitute in their stead other forms and sizes of neck-forming positions. By having these portions $s$ removable differentforms and sizes of knobs can be produced in the machine.

The mold-sections $a$ $a$ have rods E E pivoted to them, which rods extend outward and are pivoted to the shortest arms of bent levers F F.

These levers have their fulcrums at $f$ $f$, and their longest arms are connected to ears $n'$, on a vertical rod, $n$, by means of rods P P.

The lower forked end of the rod $n$ is pivoted to a treadle, G, which is supported by standards G', and which is connected on one side of its fulcrum to the table-top A by means of a helical spring, S, shown in figs. 1 and 3.

The upper forked end $n^2$ of the vertical rod $n$ receives between its forks a pin, $p$, which is applied to the forked end $e^2$ of an elevating-rod, $e^1$.

This rod $e^1$ passes up through the table-top A and through the sill $b$ of frame A, and has a cylindrical enlargement, $e$, formed on it, which forms the bottom of the mold when in the position shown in fig. 1.

The vertical axis of the rod $e^1$, and its enlargement $e$, coincide with the vertical axis of the plunger C, and also with the center of the mold-sections $a$ $a$ when the latter are brought together.

On the upper end of the enlargement $e$, and in the center thereof, rises a pin, $i$, which produces the sockets into the bases of the knobs, as shown in figs. 1 and 2. This pin $i$ may be made long enough to produce holes entirely through the knobs.

A strap, $c$, is secured fast to one of the mold-sections $a$, and its ends, which are perforated, are long enough to receive between them the other mold-section when these two sections are brought together.

The perforations through the ends of the strap $c$ are intended for receiving the ends of bolts $t\ t$, which are beveled and pivoted to a vertically-vibrating hand-lever, $s'$, on opposite sides of and equidistant from its fulcrum, so that, when the two sections $a\ a$ are allowed to go together, a single movement of the hand-lever $s'$ will force the two bolts through the ends of the strap $c$, and thus forcibly draw together said mold-sections and thus hold them firmly. The strap $c$ and its bolts thus form a band which will prevent the mold-sections from yielding laterally while the clay is being pressed into them.

Operation.

When the mold-sections $a\ a$ are brought together and locked, as above described, the clay is put into the mold in sufficient quantities to form a knob. The screw D is then turned by its T-handle, and the plunger thus forcibly driven into the mold. The workman then unlocks the sections $a\ a$, raises the plunger C, and, with his foot upon the treadle G, he depresses the treadle and separates the said sections, thus leaving the knob upon the upper end of the vertically-movable enlargement $e$. By continuing to depress the treadle the end of the rod $n$ will come in contact with the pin $p$ and raise the rod $e^1$ with the knob to the position shown in fig. 2, when it can be readily removed.

After removing the knob the workman releases the treadle and allows spring S to return the parts to the position shown in fig. 1, when the sections $a\ a$ are again locked and the process repeated, as above described.

It will be seen from the above description that the work of adjusting the mold-sections, introducing the clay, pressing the clay and removing the knobs, can be performed very rapidly and by persons who are not experienced workmen. Also, that there are no parts about the mold-sections which are liable to rapid wear, and which, for this reason, would produce imperfect work.

Having described my invention,

What I claim as new, and desire to secure by Letters Patent, is—

1. The vertically-divided and laterally-movable mold-sections $a\ a$, having applied to them the neck-forming portions $s\ s$, in combination with a pressing-plunger, C, substantially as described.

2. The elevating device $e$, in combination with the laterally-movable sections $a\ a$, constructed as described, and the pressing-plunger C, substantially as described.

3. The bracing-strap $c$, and the locking devices $t\ t\ s'$, in combination with the laterally-sliding mold-sections $a\ a$ and the accessories, substantially as described.

4. The treadle G, held up by a spring, S, and connected by levers and rods to the laterally-movable mold-sections $a\ a$, in combination with the forked rod $n$, pin $p$, and elevating-rod $e^1$, said parts being so constructed that the mold-sections $a\ a$ will be separated before the rod $e^1$, with its knob $d$, begin to rise.

CHARLES H. PALMER.

Witnesses:
EDM. F. BROWN,
J. V. CAMPBELL.